April 26, 1960  S. S. DAVIS  2,933,922
FLEXIBLE WALLED WIND TUNNEL NOZZLE
Filed Dec. 4, 1957  2 Sheets-Sheet 1
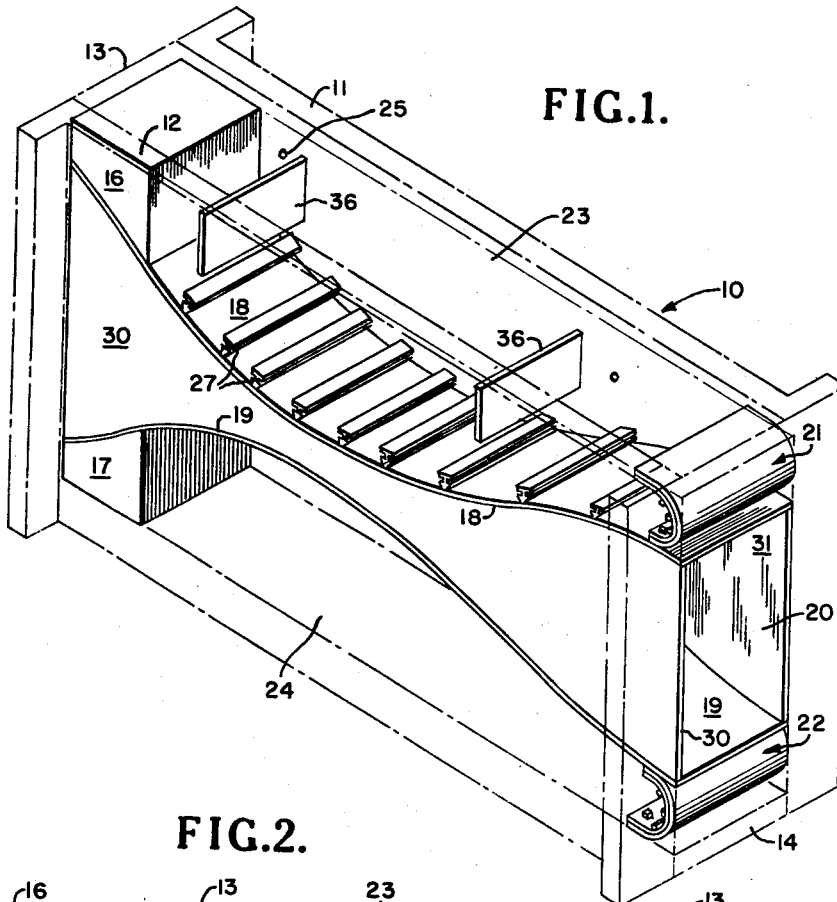
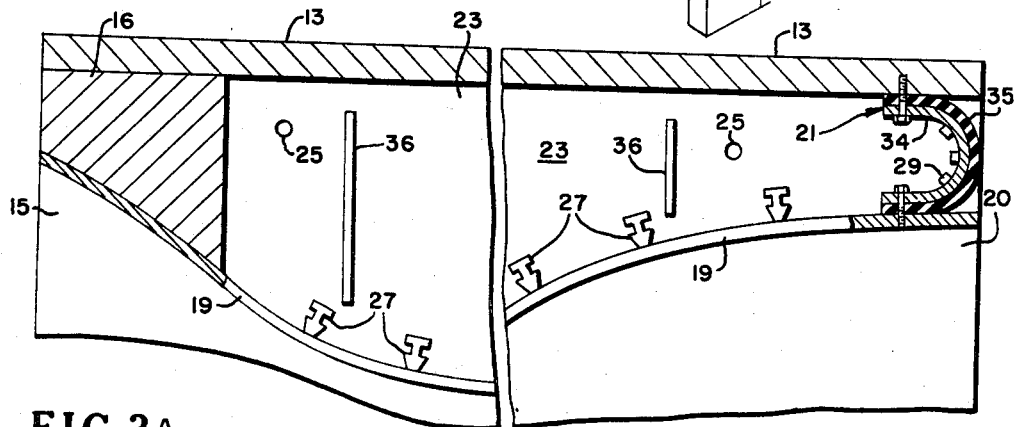
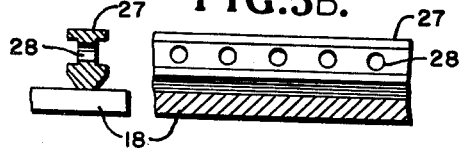
INVENTOR.
STEPHEN S. DAVIS
BY
ATTYS April 26, 1960  S. S. DAVIS  2,933,922
FLEXIBLE WALLED WIND TUNNEL NOZZLE
Filed Dec. 4, 1957  2 Sheets-Sheet 2

INVENTOR.
STEPHEN S. DAVIS
BY
ATTYS.

United States Patent Office 2,933,922
Patented Apr. 26, 1960

2,933,922

FLEXIBLE WALLED WIND TUNNEL NOZZLE

Stephen S. Davis, Washington, D.C., assignor to the United States of America as represented by the Secretary of the Navy Application December 4, 1957, Serial No. 700,726

4 Claims. (Cl. 73—147)

(Granted under Title 35, U.S. Code (1952), sec. 266)

The invention described herein may be manufactured and used by or for the Government of the United States of America for governmental purposes without the payment of any royalties thereon or therefor.

This invention relates to flexible nozzles for wind tunnels. More particularly the invention relates to means for advantageously and inexpensively forming the walls of a flexible walled wind tunnel nozzle to cause the nozzle walls to conform to any desired contour or shape to produce any given air flow.

The manufacture of wind tunnel nozzles from solid materials has proven to be a difficult and expensive process requiring initially the making of a template to the shape of the desired contour and then the machining of solid blocks of metal to form metal walls having the same contour as the template. Because of the expense and difficulty involved in this process, the contour of these nozzles, machined as they are from solid blocks of metal, cannot be corrected without great difficulty and expense after the proper contour has been determined as a result of actual flow measurements. For these reasons attempts have been made to construct flexible walled nozzles which could be substituted for or employed in lieu of these solid nozzles.

Heretofore the contours of flexible walled wind tunnel nozzles which were developed as substitutes for solid wall nozzles have been varied through the use of mechanical or hydraulic jacks such as are described in United States Patent No. 2,472,949 to James O. Jackson dated June 14, 1949. The use of jacks for this purpose, however, results in an undesirable discontinuity of the curvature of the flexible wall caused by local or point pressure on the flexible walls at the points where the jacks exert their load thereby giving uneven load distribution along the flexible walls and consequently uneven wall surfaces. Attempts to spread the load uniformly over the surface of the flexible walls have made necessary the use of large numbers of such jacks and have resulted in a very expensive and complicated apparatus without satisfactorily overcoming the discontinuity of curvature problem.

The above disadvantages are substantially overcome in accordance with the present invention by inserting in a wind tunnel provided with two stationary side walls and two flexible walls a pair of templates to control the contour of the flexible walls which are pressed against the contour of the templates by a suitable fluid pressure means. The invention provides inexpensive flexible walled wind tunnel nozzles in which the expensive mechanism heretofore employed to control the contour of the flexible walls is eliminated while at the same time providing means whereby that contour may be easily and accurately controlled and corrected when necessary.

It is, therefore, an object of the present invention to provide a simple, inexpensive flexible walled wind tunnel nozzle.

A further object is to provide a flexible walled wind tunnel nozzle having uniform load distribution along the flexible walls.

Another object is to provide a flexible walled wind tunnel having simple and accurate means of controlling the contour of the flexible walls.

Still another object is to provide a wind tunnel nozzle in which the temperature of the fluid flowing through the nozzle and the effects of heat radiation on models located in the tunnel may be controlled.

These and other objects will be apparent to those skilled in the art as the disclosure is made in the following detailed description of a preferred embodiment of the invention as illustrated in the accompanying drawings in which:

Fig. 1 is a view in perspective of a wind tunnel nozzle embodying the invention;

Fig. 2 is a side view of a portion of the nozzle of Fig. 1 showing the upper pressure chamber of the nozzle;

Figs. 3a and 3b are side and end views respectively in section and partially broken away of a flexible nozzle plate stiffening rib;

Figure 4:
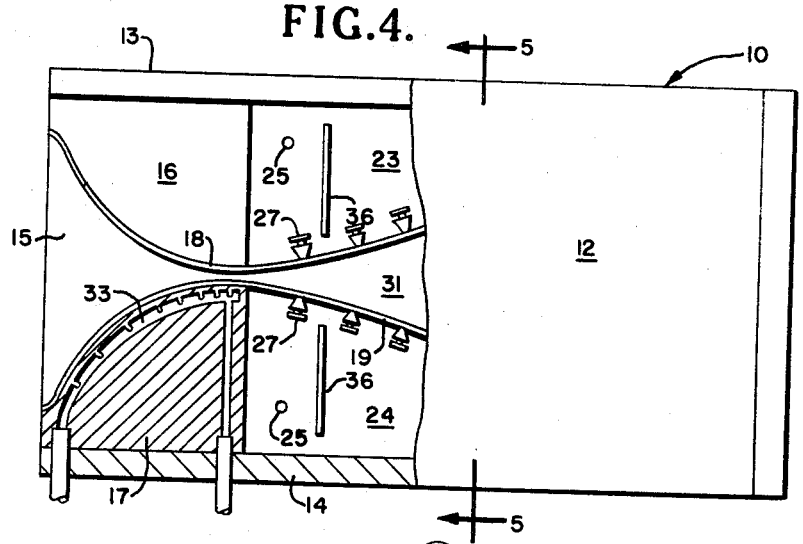
Fig. 4 is a partially cut away view of a modified form of the nozzle embodying the invention.

Wind tunnels of the type to which this invention applies are normally constructed of contiguous sections placed end to end as described in U.S. Patent No. 2,472,-949 to J. O. Jackson. However, for purposes of simplicity all parts of the wind tunnel, with the exception of the nozzle itself have been omitted from the description and the drawings.

The nozzle of the invention as illustrated in Fig. 1 consists essentially of an open ended rectangular shaped housing 10 adapted to be placed between the stilling section and the test section of a wind tunnel. The side walls 11 and 12 and the topwall 13 and bottom wall 14 of the housing 10 shown in dashed outline on Fig. 1 are heavy or reinforced flat steel plates. The adjacent faces of the side walls 11 and 12 are arranged in parallel planes.

Attached to the top wall 13 and bottom wall 14 adjacent the inlet end 15 of the nozzle by means of nozzle plate holders 16 and 17 are two flexible metal nozzle plates 18 and 19. The nozzle plates 18 and 19 are rectangular plates or relatively thin metal fitting snugly into the space between the fixed side walls 11 and 12 and in abutting relation thereto. The flexible nozzle plates 18 and 19 are attached to the top wall 13 and bottom wall 14 respectively adjacent the outlet end 20 of the nozzle housing 10 by means of flexible bellows 21 and 22 extending from one side wall to the other.

The nozzle plate holder 16, the flexible nozzle plate 18 and the flexible bellows 21 are provided with pressure seals 38 where they contact the side walls 11 and 12 and so form, with top wall 13, an upper pressure chamber 23. Similarly nozzle plate holder 17, flexible nozzle plate 19 and flexible bellows 22 are provided with pressure seals and with bottom wall 14 form a lower pressure chamber 24.

The flexible nozzle plates 18 and 19 are provided on the surfaces facing the top and bottom walls 13 and 14 with spaced stiffening ribs 27 secured to the nozzle plates at right angles to the length of the nozzle plates so as to inhibit transverse flexing of the nozzle plates while permitting longitudinal flexing thereof. Stiffening ribs 27 are provided with holes 28 as shown in Figs. 3A and 3B to permit free flow of pressure fluid along the surfaces of the nozzle plates. The stiffening ribs 27 are narrow at the point of attachment to the nozzle plates 18 and 19 so as to offer negligible resistance to the longitudinal flexing of the plates and thereby make possible the formation of smooth contoured surfaces on the inner surfaces of the nozzle plates when they are flexed.

The nozzle plate holders 16 and 17 as shown in Fig. 1 are solid steel blocks rigidly attached in any suitable manner to the top and bottom walls 13 and 14 respectively. The surfaces of the nozzle plate holders 16 and 17 opposite to the side thereof which is attached to top and bottom walls of the nozzle and to which surface the nozzle plates 18 and 19 respectively are attached, are curved to permit the flexible nozzle plates attached thereto to assume the desired contour. The nozzle plate holders act as rigid anchors to prevent longitudinal movement of the nozzle plates 18 and 19 when the nozzle is in use.

Alternatively the nozzle plate holders and their respective nozzle plates may be machined from single pieces of metal. With this construction the nozzle plate holder surface and the nozzle plate surface together form the aerodynamic surface of the nozzle walls.

The flexible bellows 21 and 22 are each constructed of a sheet of spring steel 34 bonded to sheet rubber or other resilient gasket material compatible with the fluids employed in the pressure chambers 23 and 24. The flexible bellows are curved outwardly to aid in withstanding the pressure in the chambers 23 and 24 and are provided with crosswise stiffening ribs 29 as illustrated in Fig. 2.

Baffles 36 are attached on one of the sidewalls such as sidewall 12 within the pressure chambers 23 and 24 as illustrated and so located as to direct the circulating pressure fluid against the flexible nozzle plates 18 and 19 for controlling the temperature of those plates as will be described.

The contour of the flexible nozzle plates 18 and 19 is controlled by means of a pair of identical preshaped templates 30 and 31 inserted between the flexible nozzle plates one against each of the side walls 11 and 12 and attached thereto in any suitable manner with the flat surface of the template parallel to the side walls and to each other and normal to the surface of the flexible plates 18 and 19. The templates 30 and 31 are constructed of any suitable material, such as plate steel, of sufficient strength to withstand the pressures against the templates by the flexible nozzle plates 18 and 19.

The templates 30 and 31 are accurately precut to the desired theoretically correct contour prior to insertion between the flexible nozzle plates 18 and 19. The templates are then attached to the side walls 11 and 12 by any suitable means such as by bolting and the side walls attached to the top wall 13 and bottom wall 14 to form the nozzle housing 10 as illustrated. The nozzle is then placed in position in the tunnel.

Figure 5:
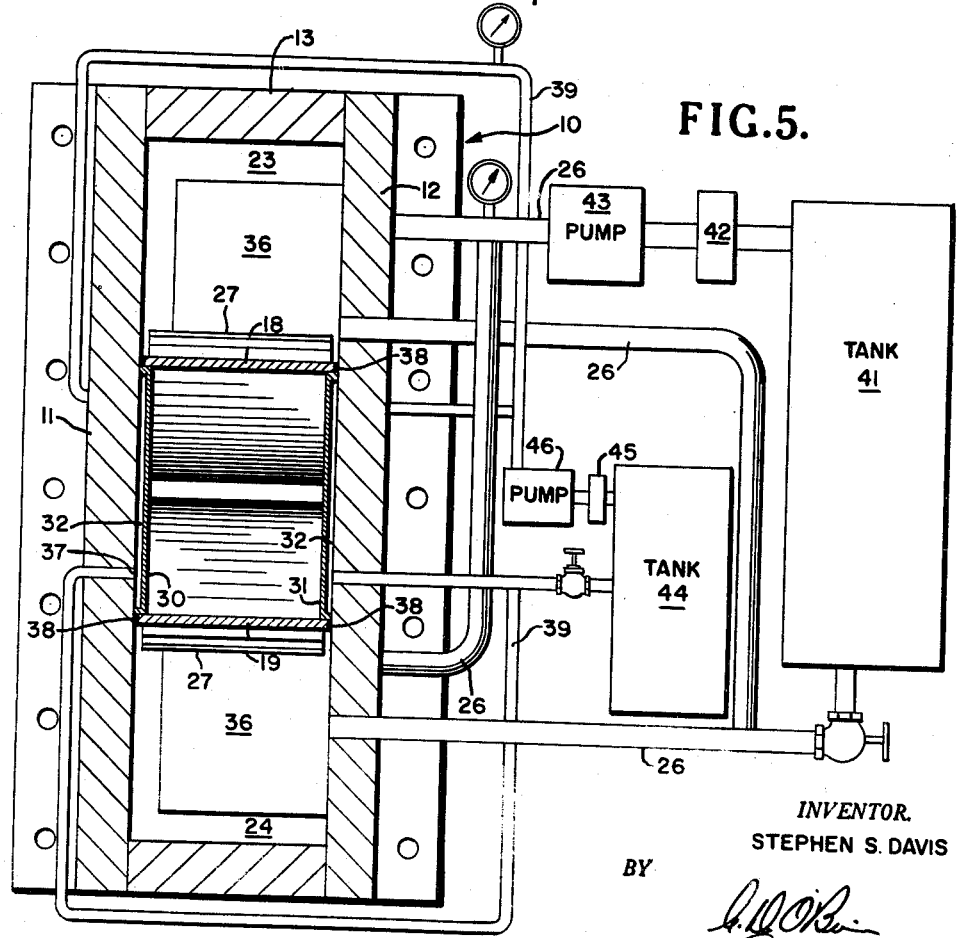
Fig. 5 is an enlarged sectional view taken along the line 5—5 of Fig. 4 showing one modified form of the nozzle of the invention in which the templates are provided with channels to allow the passage of heat transfer fluid.

The flexible nozzle plates 18 and 19 are forced to assume the contour of the templates 30 and 31 by fluid under pressure forced into the pressure chambers 23 and 24. This fluid is admitted to the pressure chambers 23 and 24 through suitable openings 25 in side wall 12. These openings 25 are connected by means of suitable piping 26 to a source of fluid under a constant pressure at a constant temperature such as the reservoir tank 41, heat exchanger 42, and constant pressure pump 43 as illustrated in Fig. 5. The piping 26 may be provided with pressure gauges and valves as illustrated to regulate the pressure and flow of fluid in the system.

Any suitable pneumatic or hydraulic fluid may be employed as the pressure fluid of the invention. However an oil having a high viscosity index i.e., a small change in viscosity with a large change in temperature, is preferred for use as the pressure fluid in the nozzle of the invention. An oil which has been found suitable for use in nozzles of the invention is Sunvis 900 available from the Sun Oil Co.

The pressure fluid employed to cause the flexible nozzle plates 18 and 19 to conform to the contour of the templates 30 and 31 may be used to control the temperature of the nozzle. This is done by controlling the temperature of the fluid. If further control of the temperature of the nozzle is desired the templates 30 and 31 may be provided with channels 32 as illustrated in Fig. 5. These channels 32 may be connected to the same source of fluid as is utilized in the pressure chambers 23 and 24 or it may be connected by way of openings 37 and piping 39 to a separate source of constant temperature fluid such as the reservoir tank 44, heat exchanger 45 and pump 46 illustrated in Fig. 5. Piping 39 may be provided with a valve to control the flow of fluid through the system as desired.

For additional cooling the nozzle plate holders 16 and 17 may be provided with chambers or channels 33 as illustrated in Fig. 4. Channels 33 may be connected to a source of controlled constant temperature fluid such as by means of piping 26 as desired.

Where the fluid used to control the temperature of the templates 30 and 31 and the nozzle plate holders 16 and 17 is different from that utilized in the pressure chambers 23 and 24, any suitable fluid may be employed such as water or refrigerants.

If after the nozzle has been in operation, it is found necessary or desirable to change the contour of the nozzle it is merely necessary to remove the templates 30 and 31, machine them to the desired contour and replace them or substitute therefor differently contoured templates.

The radius of curvature of the flexible nozzle plates 18 and 19 depends upon the Mach number at which the wind tunnel is to operate. Knowing the radius of curvature desired, the thickness of the nozzle plates 18 and 19 of a known material which may be so curved without rupture, may be computed from the formula $$d = \frac{2SR}{E}$$

wherein $d$ is the thickness of the plate in inches, $S$ is the stress, $R$ is the radius of curvature and $E$ is the modulus of elasticity.

The pressure required to cause a flexible nozzle plate of known dimensions and known material to conform to the desired contour may be obtained from the formula $$P = \frac{2yEd^3}{3l^4}$$

wherein $P$ is the pressure in pounds per square inch, $y$ is the deflection of the plate in inches, $d$ is the thickness of the plate in inches, $l$ is the length of the plate in inches and $E$ is the modulus of elasticity.

Thus for a nozzle four feet long wherein a four inch deflection is required using a stainless steel nozzle plate $5/16''$ thick $$P = \frac{2yEd^3}{3l^4}$$

$$P = \frac{2 \times 4 \times 29,000,000 \times (.312)^3}{3 \times (48)^4}$$

$$P = .44 \text{ lbs./sq. in.}$$

Thus a pressure of less than .5 lb./sq. in. is sufficient to cause the nozzle plate to conform to the contour of the template. A pressure several times that is usually desirable to insure a close seal between the nozzle plate and the template.

From the foregoing it may be seen that there has been provided a simple, inexpensive flexible walled wind tunnel nozzle having uniform load distribution all along the flexible walls, the contour of which walls may be easily and accurately controlled. In addition a wind tunnel is provided the temperature of which may be controlled and through this means the temperature of the fluid flow and the radiation effects on models in the tunnels may be controlled. The nozzle described above is useful in subsonic transonic, supersonic and hypersonic tunnels.

Obviously, many modifications and variations of the present invention are possible in the light of the above teachings. It is, therefore, to be understood, that within the scope of the appended claims, the invention may be practiced otherwise than as specifically described.

What is claimed is:

1. A wind tunnel nozzle structure comprising a pair of spaced parallel side walls, a pair of spaced, longitudinally flexible plates arranged between said side walls and normal thereto, a pair of templates having substantially identically curved edges said templates being attached respectively to said side walls between said flexible plates, and a fluid under pressure pressing said flexible plates against said edges of said templates so as to cause said plates to assume the shape of said curved edges and to form with said templates a rectangular duct of predetermined varying cross section.

2. A wind tunnel nozzle structure comprising a pair of spaced parallel, fixed walls, a pair of spaced longitudinally flexible plates arranged between said fixed walls and normal thereto in a manner to define a rectangular duct of varying cross section, a pair of plate contour determining templates respectively attached to said fixed walls and parallel thereto, and fluid means pressing said flexible plates against said templates.

3. A wind tunnel nozzle structure comprising a rectangular, open ended housing having a pair of spaced parallel side walls and a top wall and bottom wall, a first longitudinally flexible nozzle plate attached to said top wall and forming therewith an upper pressure chamber, a second longitudinally flexible nozzle plate attached to said bottom wall and forming therewith a lower pressure chamber, said flexible nozzle plates fitting snugly between said side walls and in a plane normal thereto, two templates having substantially identically curved edges inserted between said flexible nozzle plates and normal thereto, one template attached to each of said side walls, and fluid under pressure in each of said pressure chambers pressing said nozzle plates against the curved edges of said templates to cause said nozzle plates and said templates to form a rectangular duct of predetermined varying cross section.

4. A wind tunnel nozzle structure comprising a rectangular, open ended housing having a pair of spaced, parallel side walls and a top wall and a bottom wall, a first longitudinally flexible nozzle plate attached to said top wall and forming therewith an upper pressure chamber, a second longitudinally flexible nozzle plate attached to said bottom wall and forming therewith a lower pressure chamber, said flexible nozzle plates fitting snugly between said side walls and in a plane normal thereto, two templates having substantially identically curved edges inserted between said flexible nozzle plates and normal thereto, one of said templates attached to each of said side walls, channels in said templates, a first fluid under pressure circulating in said pressure chambers, a second fluid circulating in said channels, means for controlling the temperature and pressure of said first fluid and means for controlling the temperature of said second fluid, said first fluid pressing said flexible nozzle plates against the curved edges of said templates to cause said plates and said templates to form a rectangular duct of varying cross section, the temperature of said first and second fluids applying a temperature control to the air blowing through the nozzle.

References Cited in the file of this patent

UNITED STATES PATENTS

| | | |
|---|---|---|
| 2,570,129 | Johnson | Oct. 2, 1951 |
| 2,590,215 | Sausa | Mar. 25, 1952 |
| 2,663,322 | Allen et al. | Dec. 22, 1953 |
| 2,725,218 | Cuming | Nov. 29, 1955 |